L. A. KLING.
SLACK ADJUSTER FOR CAR BRAKES.
APPLICATION FILED MAY 20, 1912.
1,110,141.
Patented Sept. 8, 1914.
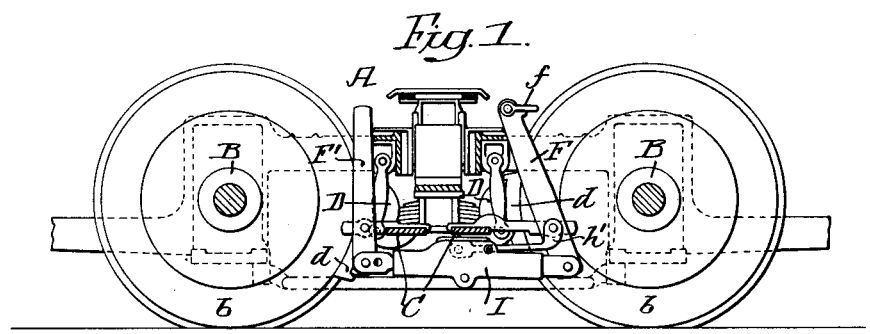
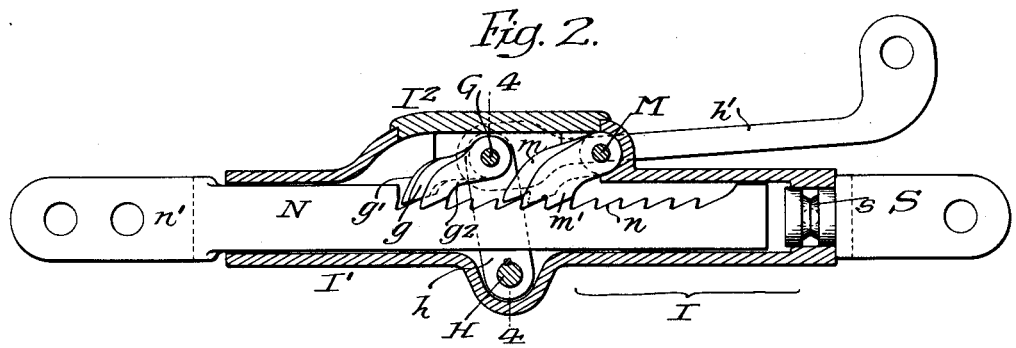
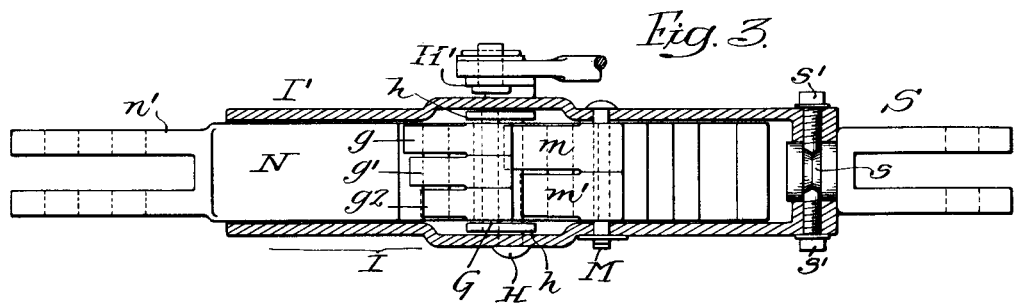
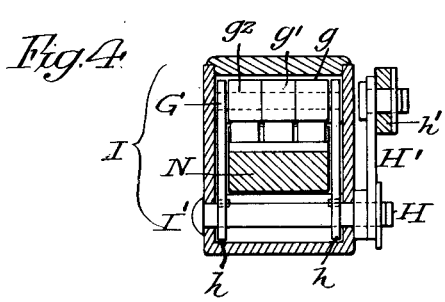
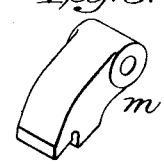
Witnesses—
Inventor—
Louis A. Kling.
by his Attorneys—

UNITED STATES PATENT OFFICE.

LOUIS A. KLING, OF ELIZABETH, NEW JERSEY, ASSIGNOR TO THE J. G. BRILL COMPANY, OF PHILADELPHIA, PENNSYLVANIA, A CORPORATION OF PENNSYLVANIA.

SLACK-ADJUSTER FOR CAR-BRAKES.

1,110,141.  Specification of Letters Patent.  Patented Sept. 8, 1914.

Application filed May 20, 1912. Serial No. 698,579.

*To all whom it may concern:*

Be it known that I, LOUIS A. KLING, a citizen of the United States, residing in Elizabeth, county of Union, State of New Jersey, have invented certain Improvements in Slack-Adjusters for Car-Brakes, of which the following in a specification.

The object of my invention is to provide means for automatically taking up the slack due to the wear of the brake shoes and wheels.

By my invention the necessity for adjusting the parts at the car barn is dispensed with, as the slack can be automatically taken up until the shoes have to be replaced, or until the wheels have to be renewed.

In the accompanying drawings:—Figure 1, is a longitudinal sectional view of a car truck, illustrating my invention; Fig. 2, is an enlarged sectional view of my improved slack adjuster; Fig. 3, is a section plan view; Fig. 4, is a transverse sectional view on the line 4—4, Fig. 2; Fig. 5, is a perspective view of one of the adjusting pawls; and Fig. 6, is a perspective view of one of the holding pawls.

A is a truck frame, which may be of any ordinary type having boxes for the axles B on which are mounted the wheels $b, b$.

C, C are the brake beams. These brake beams are hung from the truck frame by hangers or links.

D, D are the brake heads having shoes $d$.

F is the main operating lever connected to one brake beam and connected through the slack adjuster I to the lever F', having its dead end resting against the frame, and connected to the other brake beam, as clearly shown in Fig. 1. The lever F is connected at $f$ to the operating rod which leads to the brake operating mechanism of the car. Any motion given to the lever F is imparted to the lever F' through the slack adjuster I.

As the brake shoes and the tread surfaces of the wheels wear, the slack due to the wear must be taken up and the object of my invention is to provide means whereby this slack is taken up automatically.

The slack adjuster I consists of a casing I' and a sliding bar N having ratchet teeth $n$. On the end of this bar is a head $n'$ having one or more perforations for the pivot pin connecting the head to the lever F'. Mounted on a pivot pin M are two pawls $m$ and $m'$; one being set slightly in advance of the other. Each pawl has two teeth so that they will hold the ratchet bar N when it is adjusted to take up the slack due to wear. The two teeth with which each pawl is provided materially strengthen it, as either one of the pawls holds the ratchet bar in the position to which it is adjusted. The casing I' is rounded so as to form a pocket for the reception of the pivot end of the pawls, Fig. 2, in order to relieve the pivot pin from strain. Pivotally mounted in the casing is a rock shaft H, on which are secured two arms $h, h$. Connecting these two arms is a pivot pin G on which are mounted three pawls $g, g', g^2$ of different lengths, so that if the slack due to wear is one-third of the distance between the teeth of the rack bar, one of the pawls will drop into engagement with one of the teeth; shifting the rack bar a sufficient distance for one of the pawls $m$ or $m'$ to engage a new tooth, thus increasing the length of the slack adjuster and taking up the necessary slack. There is a slight lost motion between the two sets of pawls and this is sufficient to allow movement for the application or release of the brakes, or the necessary operating clearance between the brake shoes and the wheels.

On the end of the rock shaft H, outside of the casing I', is a lever H' which is connected by a link $h'$ to the lever F, in the present instance at the same point at which the brake beam link is pivoted, so that the movement of this link and that of the rock shaft is controlled solely by the wear of the parts.

At one end of the casing I' is a head S having a rounded shank which enters the opening in the casing. This shank has an annular groove $s$ and extending into this groove at opposite points are screws $s'$ which retain the head in the casing and yet allow the casing to turn on the head. In the head $n'$ of the bar N, in the present instance, are two openings for the reception of the pivot pin which connects the head to the operating lever F', so that as the wheels wear and the slack adjuster is automatically taken up to its full extent, the slack adjuster can be reset and the pivot pin can be moved to the second opening.

In the present instance, I form an opening in the top of the casing I' of the slack adjuster, so that access may be had to the two sets of pawls. This opening can be closed by a cover plate I² secured in position by bolts or other suitable means. An opening may be made in the bottom and closed by a cap, if desired.

The operation is as follows:—As the brake shoes are applied, the operating lever F is moved and this movement is imparted to the rock shaft H, which moves the pawls $g$, $g'$, $g^2$ over the teeth of the bar N. These pawls, however, will not shift the bar until a certain amount of wear takes place and one of the pawls, due to this wear, engages one of the teeth and the pawl, upon the next movement of the brake mechanism, will push the bar forward so that one of the holding pawls $m$, $m'$ will drop back of a new tooth; thus elongating the slack adjuster and increasing the distance between the lower ends of the levers F, F'; taking up the slack due to wear. This is repeated, as the wear increases until new brake shoes are necessary and new wheels are required. Of course, it will be understood that the brake shoes wear out more rapidly than the surface of the wheels and, consequently, these would have to be constantly renewed. When it is desired to readjust the rack bar N, the link $h'$ is disconnected and the pivot pin connecting the head $n'$ of the rack bar on the lever is drawn, then the casing I' can be turned on the shank of the head S so as to invert the pawls, which will drop out of engagement with the teeth of the rack bar; allowing the rack bar to be forced into the casing to the full extent. The casing is then turned to its normal position; the pawl dropping into engagement with the teeth; the head $n'$ being coupled to its lever and the head $h'$ being also coupled to its lever. Thus, the parts are again set for automatic operation.

While I have shown my improved slack adjuster in connection with a truck in which brake beams are used and requiring only a single adjuster, it will be understood that where brake beams are dispensed with then a slack adjuster is required at each side of the truck connecting the two brake levers.

I claim:—

1. The combination in a slack adjuster for car brakes, of two brake levers; means for operating one brake lever; a casing attached to one of said levers and a toothed bar attached to the other lever; a pawl pivotally mounted on the casing adapted to hold the bar in the position to which it is adjusted; an additional pawl; means connecting the last mentioned pawl with the operating brake lever so that said pawl is moved when the brakes are applied; a head swiveled to the casing so that on detaching the bar from its brake levers, the casing can be inverted to allow the pawls to drop clear of the teeth of the rack bar.

2. The combination in a slack adjuster for car brakes, of two brake levers; means for actuating one of said levers; a casing attached to one of said levers; a rack bar mounted in the casing and attached to the other lever; two pawls pivotally mounted in the casing; one pawl being set in advance of the other; a rock shaft in the casing having two arms; a pivot pin extending from one arm to the other; three pawls mounted on the pin and arranged to engage the teeth of the rack bar; said pawls being set one in advance of another; an arm attached to the rock shaft on the outside of the casing; a link connecting the arm to the lever which is attached to the casing, said casing having an opening therein; and a cap closing said opening.

In testimony whereof, I have signed my name to this specification, in the presence of two subscribing witnesses.

LOUIS A. KLING.

Witnesses:
 CLYDE T. MOYER,
 WM. A. BARR,